US010723480B1

(12) United States Patent
McCusker et al.

(10) Patent No.: US 10,723,480 B1
(45) Date of Patent: Jul. 28, 2020

(54) SYSTEM AND METHOD FOR PREVENTION AND RECOVERY FROM HIGH ALTITUDE STALLS

(71) Applicant: Rockwell Collins, Inc., Cedar Rapids, IA (US)

(72) Inventors: Patrick D. McCusker, Walker, IA (US); Keith A. Stover, Lisbon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 248 days.

(21) Appl. No.: 15/799,729

(22) Filed: Oct. 31, 2017

(51) Int. Cl.
*B64D 45/00* (2006.01)
*G05D 1/08* (2006.01)

(52) U.S. Cl.
CPC .......... *B64D 45/00* (2013.01); *G05D 1/0816* (2013.01)

(58) Field of Classification Search
CPC ....... B64D 43/02; B64D 45/00; G05D 1/0816
See application file for complete search history.

(56) References Cited

U.S. PATENT DOCUMENTS

| | | | | |
|---|---|---|---|---|
| 8,504,222 B2* | 8/2013 | Braly | ................. | B64D 45/0031 701/4 |
| 9,218,741 B2* | 12/2015 | Wu | ....................... | G01S 13/876 |
| 9,938,018 B2* | 4/2018 | Welsh | ................... | B64D 43/02 |
| 2011/0224849 A1* | 9/2011 | Braly | ................. | B64D 45/0031 701/9 |
| 2015/0331099 A1* | 11/2015 | Wu | ....................... | G01S 13/876 342/32 |
| 2016/0347469 A1* | 12/2016 | Welsh | ................... | B64D 43/02 |
| 2017/0101193 A1* | 4/2017 | Williams | ............... | B64D 45/00 |
| 2018/0205658 A1* | 7/2018 | Sullivan | ................. | H04L 67/12 |

\* cited by examiner

*Primary Examiner* — Jerrah Edwards
(74) *Attorney, Agent, or Firm* — Suiter Swantz pc llo

(57) ABSTRACT

An aircraft-based stall prediction and recovery system may be embodied in a flight control system connected to aural/visual annunciators and flight controls (e.g., throttles and control surfaces). Based on received environmental data, the stall prediction and recovery system may detect imminent upset conditions (e.g., underspeed or overspeed) based on minimum and maximum operating speeds for the current airframe, altitude, and atmospheric conditions. The stall prediction and recovery system may notify the crew of the imminent upset and advise corrective measures. If a stall warning is received, the stall prediction and recovery system may engage an auto-recovery mode, notifying the crew of the engagement and restoring the aircraft to a safe target airspeed via automated recovery procedures, e.g., correcting the aircraft angle of attack and/or attitude. Upon resolution of the stall, the stall prediction and recovery system may disengage the auto-recovery mode, notifying the crew via the annunciators.

20 Claims, 5 Drawing Sheets

SYSTEM AND METHOD FOR PREVENTION AND RECOVERY FROM HIGH ALTITUDE STALLS

BACKGROUND

High-altitude flight may be especially challenging for pilots due to the narrow range of acceptable airspeeds between the minimum and maximum operating airspeeds. An aircraft may easily be pushed out of this narrow range, and into a stall condition, by minor atmospheric disturbances (e.g., turbulence) or minor heading changes (or other adjustments) on the part of the pilot or crew. Most pilots are trained for low-altitude stall recovery but not for high-altitude stall recovery. For example, when the aircraft approaches an overspeed condition associated with a maximum operating speed (e.g., a maximum limit operating speed $V_{MO}$ given the particular airframe and the current altitude/atmospheric conditions) the aircraft will experience buffeting. Similarly, the aircraft will also experience buffeting when approaching an underspeed condition associated with a minimum operating speed (e.g., a $V_{MIN}$ or stall speed). At lower altitudes, the difference between buffeting associated with flying too fast and buffeting associated with flying too slow is clear to the pilot, who may then execute an appropriate response in each case.

At higher altitudes (e.g., approaching a "coffin corner" or aerodynamic ceiling) the separation between minimum and maximum operating speeds may be so small that the pilot may not clearly recognize whether the associated buffeting is a product of too little or too much airspeed. Consequently, the pilot's responsive action may be delayed (e.g., due to a preoccupation with manual flight control, which is far more difficult at higher altitudes, or a startled reaction to a sudden stall warning), inappropriate, or even counterproductive. For example, overcorrection for detected stall conditions (e.g., in or approaching an underspeed condition) may place the aircraft into an equally dangerous overspeed condition.

While autoflight and autopilot systems may provide more stable high-altitude flight control, these systems may not be used properly by pilots, or may not be programmed to effectively respond, in the event of a high-altitude stall or high-speed upset. Worse yet, the autopilot system may fail to quickly and effectively recover (being programmed for low-altitude rather than high-altitude response) and the pilot may compound the problem by disengaging the autopilot, manually attempting to recover from a high-altitude stall or high-speed upset with ineffective low-altitude recovery techniques.

SUMMARY

In one aspect, embodiments of the inventive concepts disclosed herein are directed to an aircraft-based system for automatic prediction of, and recovery from, high-altitude stalls. The stall prediction and recovery system may be embodied in a flight control system connected to aural and/or visual annunciators (e.g., aural alerts, primary flight displays (PFD) or heads-up displays (HUD) and flight controls such as the throttle and control surfaces. The stall prediction and recovery system may receive aircraft environmental data indicative of the current airspeed, altitude, and atmospheric conditions external to the aircraft. Based on the received environmental data, the stall prediction and recovery system may detect an imminent high-speed upset such as a high-altitude stall (due to underspeed) or overspeed condition. The stall prediction and recovery system may notify the crew of the detected imminent high-speed upset via the annunciators and advise corrective measures. If stall conditions are detected, the stall prediction and recovery system may engage an auto-recovery mode, notifying the crew of the engagement via the annunciators and restoring the aircraft to a safe target airspeed via automated recovery procedures, e.g., controlling the throttle and control surfaces to correct the angle of attack and/or attitude of the aircraft. Upon achievement of the target airspeed, the stall prediction and recovery system may disengage the auto-recovery mode, notifying the crew of the disengagement via the annunciators.

In a further aspect, embodiments of the inventive concepts disclosed herein are directed to a method for high-altitude stall prediction and recovery. The method may include receiving environmental data via an aircraft-based flight control system, the environmental data associated with atmospheric conditions external to the aircraft and including a current airspeed and current altitude. The method may include detecting, via the flight control system, an imminent high-speed upset (e.g., a high-altitude stall or overspeed condition) based on the received environmental data. The method may include alerting the crew of the aircraft of the imminent upset via aural or visual annunciators (e.g., aural alerts, flight displays, heads-up displays). The method may include engaging an auto-recovery mode of the flight control system if stall conditions are detected or a stall warning is received, for returning the aircraft to a target airspeed. The method may include alerting the crew to the engagement of the auto-recovery mode via the annunciators. The method may include restoring the aircraft to the target airspeed via automated recovery procedures executed by the flight control system (e.g., direct control of the throttle and control surfaces to adjust the angle of attack, attitude, or airspeed). The method may include disengaging the auto-recovery mode on restoration of the aircraft to the target airspeed (e.g., recovery from the stall or overspeed condition). The method may include alerting the crew to the disengagement of the auto-recovery mode via the annunciators.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
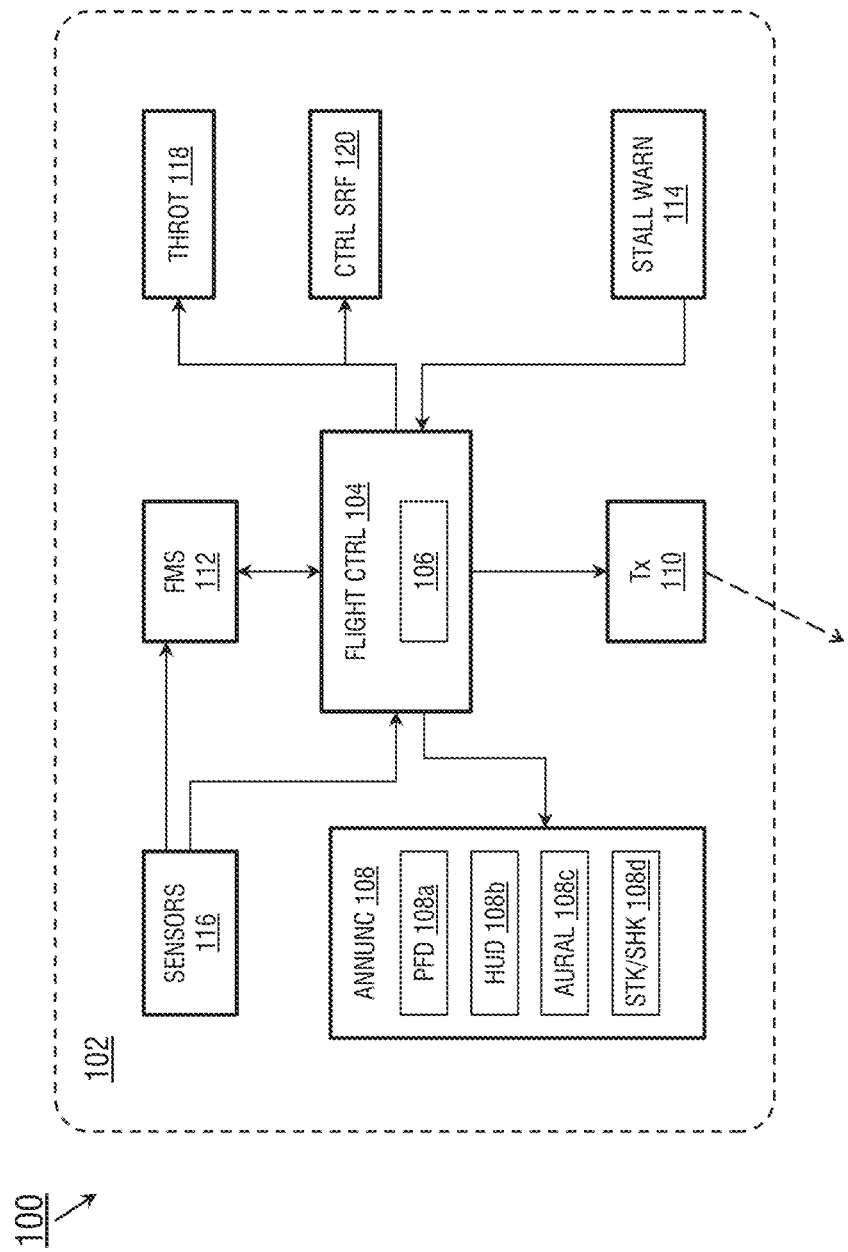
FIG. 1 is a diagrammatic illustration of an exemplary embodiment of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to an aircraft-based system and related method for prediction of, and automated recovery from, high-altitude stalls. The system may prevent delayed or ineffective reactions to a high-altitude stall on the part of the pilot. The pilot may be startled by a stall warning or untrained in effective measures for responding to high-altitude stalls. The system may help autoflight or autopilot systems, which may respond to a high-altitude stall in prompt yet but ineffectual ways, to take immediate and effective action to stabilize the aircraft.

Referring to FIG. 1, an exemplary embodiment of a stall prediction and recovery system 100 according to the inventive concepts disclosed herein may be embodied aboard an aircraft 102 and may include, for example, a flight control system 104 (incorporating flight control processors 106), annunciators 108, and a transmitter 110. The aircraft 102 may be of any appropriate size and configuration, from a small propeller-driven craft to a business jet to a larger-scale commercial jet aircraft. Depending on the size and configuration of the aircraft 102, the stall prediction and recovery system 100 may include, or may communicate with, a flight management system 112 (FMS), a stall warning computer 114, and aircraft sensors 116 (e.g., a pitot-static system for determining airspeed and altitude). For example, the flight control system 104 may continuously receive environmental data, either from the FMS 112 or directly from onboard aircraft sensors 116, and based on the received environmental data determine whether the aircraft 102 is trending toward a high-altitude high-speed upset (e.g., an overspeed or underspeed condition). A stall may itself be detected by the onboard stall warning computer 114, which may issue a stall warning; however, the FMS 112 may evaluate whether, given a particular airframe at the indicated altitude and airspeed, upset or stall conditions are imminent. If the FMS 112 determines that an upset is imminent, the pilot or crew may be notified by the annunciators 108. If imminent upset or stall conditions persist, or no responsive input is detected by the flight control system 104 in response to an imminent upset warning, the stall prediction and recovery system 100 may detect an upset or stall and respond appropriately by engaging an auto-recovery mode.

The annunciators may be tailored to each particular flight deck as well as to the capabilities of pre-existing or newly installed display and alert systems. The annunciators may include aural alert systems (108a), primary flight displays 108b (PFD) or heads-up displays 108c (HUD), or any appropriate visual, aural, or tactile alert systems 108d (e.g., a stickshaker), and may provide unique aural alerts or visual indicators when upset or stall conditions are imminent to alert the pilot or crew to take corrective measures, e.g., that the aircraft should descend to gain airspeed and avoid a stall.

The FMS 112 may respond to an imminent upset alert with corrective measures, or the pilot may respond manually (e.g., by actuating the throttle 118 or control surfaces 120 (ailerons, elevators, flaps)). If imminent upset conditions persist despite responsive input, or no responsive input is detected by the flight control system 104 (e.g., within a predetermined time window), the flight control system 104 may generate an escalated alert or escalating sequence of alerts (e.g., an advisory, a caution, a warning) if the imminent upset conditions are not addressed. The level of detail provided by imminent upset alerts (e.g., current altitude or airspeed, minimum/maximum operating airspeeds, and the delta therebetween) may likewise vary with the size and/or configuration of the aircraft.

If, after one or more imminent upset alerts have been issued by the annunciators 108, conditions persist or no responsive input is detected, the flight control system 104 may respond by declaring an upset or stall; alternatively, the stall warning computer 114 may report a stall warning to the flight control system 104. For example, in the event of a high-altitude stall (a current airspeed too low (underspeed) for the current altitude, airframe, and atmospheric conditions), the flight control system 104 may disengage the FMS 112 and initiate automated recovery procedures to stabilize the aircraft 102 at an appropriate target airspeed. For example, in the event of an underspeed condition, the flight control system 104 may cause the aircraft 102 to descend in order to gain airspeed by adjusting the angle of attack and increasing the throttle. The flight control system 104 may alert the pilot, via, e.g., a warning provided by the annunciators 108, that the auto-recovery mode has been engaged. In addition, the annunciators 108 may provide additional detail to the pilot, e.g., indications of recovery procedures or changes in airspeed, altitude, or attitude as a result of recovery procedures. Once the aircraft 102 has been stabilized, the annunciators 108 may inform the pilot that the flight control system 104 has disengaged the recovery mode.

As recovery procedures initiated by the flight control system 104 may cause the aircraft 102 to lose altitude, the aircraft 102 may externally report the change in altitude via the onboard transmitters 110. The transmitters 110 may include Mode-S transponders, Automated Dependent Surveillance-Broadcast (ADS-B) or Traffic Collision and Avoidance System (TCAS) compatible transponders, ADS-B In/Out compatible transceivers, or any other appropriate transponders or transceivers configured to broadcast a position and identifier of the aircraft 102. For example, should the recovery procedures result in a loss of altitude that brings the aircraft 102 proximate to a neighboring aircraft or its allotted airspace, the aircraft 102 may notify the neighboring aircraft (either directly or via air traffic control, if e.g., the neighboring aircraft is not equipped with ADS-B In capability) via ADS-B Out or TCAS messages sent by the transmitters 110. The transmitters 110 may be configured for any other appropriate means of communication, e.g., voice and/or data link (e.g., controller-pilot datalink communications (CPDLC)).

Figure 2:
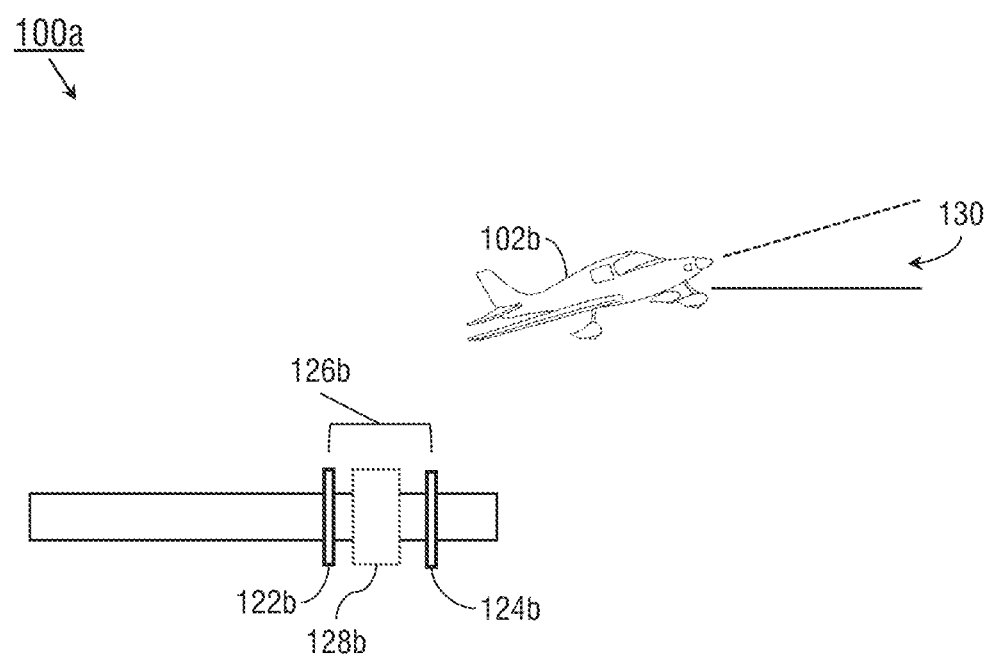
FIG. 2 illustrates operations of the system of FIG. 1.
Figure 2:
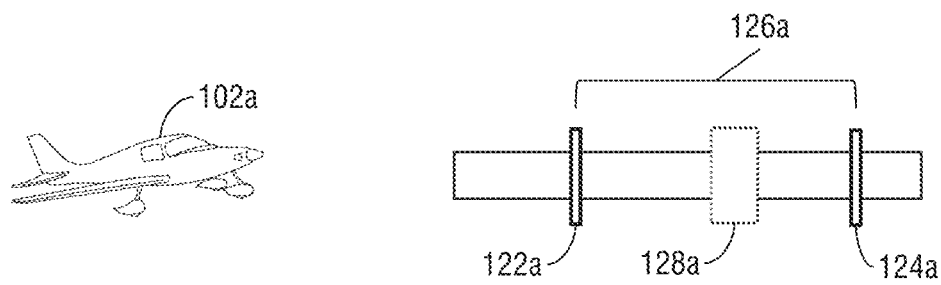

Referring now to FIG. 2, the stall prediction and recovery system 100a may be implemented and may function similarly to the stall prediction and recovery system 100 of FIG. 1, except that the stall prediction and recovery system 100a may detect an imminent high-speed upset based on a maximum operating airspeed (e.g., a maximum operating limit speed $V_{MO}$) and minimum operating airspeed (e.g., a stall speed $V_S$) for the particular airframe given the current altitude and atmospheric conditions. A high-speed upset may include, e.g., a high-altitude stall (due to underspeed) or an overspeed condition. As with other performance conditions, maximum and minimum operating speeds vary not only from airframe to airframe but also depending on atmospheric conditions external to the airframe, e.g., air temperature and pressure, wind magnitude and direction, and turbulence. For example, the aircraft 102a may operate at a relatively low altitude, at which the minimum operating airspeed (122a) and maximum operating airspeed (124a) may be relatively far apart (Δ 126a). As the current airspeed (128a) of the aircraft 102a (which may vary depending upon the shifting combination of atmospheric conditions from moment to moment) remains within the delta 126a, the risk that the aircraft 102a may be driven by external conditions into an imminent a high-speed upset, e.g., an overspeed condition or a high-altitude stall due to underspeed (wherein the current airspeed 128a of the aircraft 102a is respectively under the minimum operating airspeed 122a), is relatively low. Furthermore, the pilot of the aircraft 102a may be trained as to the proper response procedures (e.g., increasing thrust) should a low-altitude stall be declared by the stall warning computer (114, FIG. 1).

By contrast, the aircraft 102b may operate similarly to the aircraft 102a, but at a higher altitude (e.g., cruising altitude) where the minimum operating airspeed 122b and maximum operating airspeed 124b are far closer together (delta 126b) and where the current airspeed (128b) is highly susceptible to shifts in the wind or other atmospheric conditions. Because the minimum and maximum operating airspeeds 122b, 124b are far closer together at high altitude, the likelihood is far higher that the current airspeed 128b of the aircraft 102b may be pushed either above or below the range of acceptable operating airspeeds (Δ 126b) by relatively minor external conditions (e.g., sudden bursts of turbulence, storms, icing) or minor heading adjustments by the pilot, resulting in an upset. Consequently, the risk of overspeed/underspeed, or the likelihood of imminent stall conditions, is higher at high altitudes and may even be contributed to by the flight control system 104 or FMS 112 (FIG. 1), as noted earlier. Further, the pilot or crew may not be as well trained for high-altitude stall response as opposed to low-altitude stall response. Compounding the problem, even if the flight control system 104 is activated (e.g., because control of the aircraft 102b may be more difficult or demanding at higher altitudes due to the lower air density), the flight control system similarly may not be programmed for effective high-altitude stall response. As a result, the higher likelihood of high-altitude, high-speed upset for the aircraft 102b may lead to several possible adverse outcomes. First, the pilot may be preoccupied with multiple tasks (e.g., maintaining proper separation from other air traffic) and may be startled by a stall warning, resulting in a response that is both delayed in its inception (due to lack of situational awareness or anxiety over potential altitude violations) and inadequate to the problem at hand (due to lack of proper training for high-altitude stall response). Second, the flight control system 104 may respond promptly to a stall warning if activated, but in ineffectual ways (as the flight control system may be programmed to handle low-altitude but not high-altitude stalls). For example, the flight control system 104 may maximize thrust (via the throttle 118, FIG. 1); at higher altitudes, however, slow engine response at the higher altitude may not achieve the intended goal of maintaining altitude and recovering from the stall. Third and finally, the pilot may react to an ineffectual response from the flight control system 104, as described above, by disengaging the flight control system 104, relying on his/her own training and/or manual flight control ability (either or both of which may be inadequate, as noted above) to bring the aircraft 102b out of the high-altitude stall. Alternatively, the flight control system 104 may self-disengage, without informing the pilot as to why. However, unlike low-altitude stalls, merely increasing thrust may not be enough to recover from a high-altitude stall without also reducing the angle of attack (130) of the aircraft 102b, in effect trading a temporary loss of altitude to recover the target airspeed.

In order to predict and prevent stall conditions, the stall prediction and recovery system 100a may continuously monitor atmospheric conditions around the aircraft 102b as well as the minimum and maximum operating airspeeds 122b, 124b. For example, should the aircraft 102b trend toward an underspeed or overspeed condition, the stall prediction and recovery system 100a may alert the pilot or crew of the imminent upset (via the annunciators 108, FIG. 1) and to descend in order to avoid the upset or stall. In the event of a delayed response to an imminent upset alert, or the persistence of imminent upset or stall conditions over time, the stall prediction and recovery system 100a may generate a series of escalating alerts (e.g., advisory, caution, warning) until the imminent upset condition is rectified.

Figure 3:
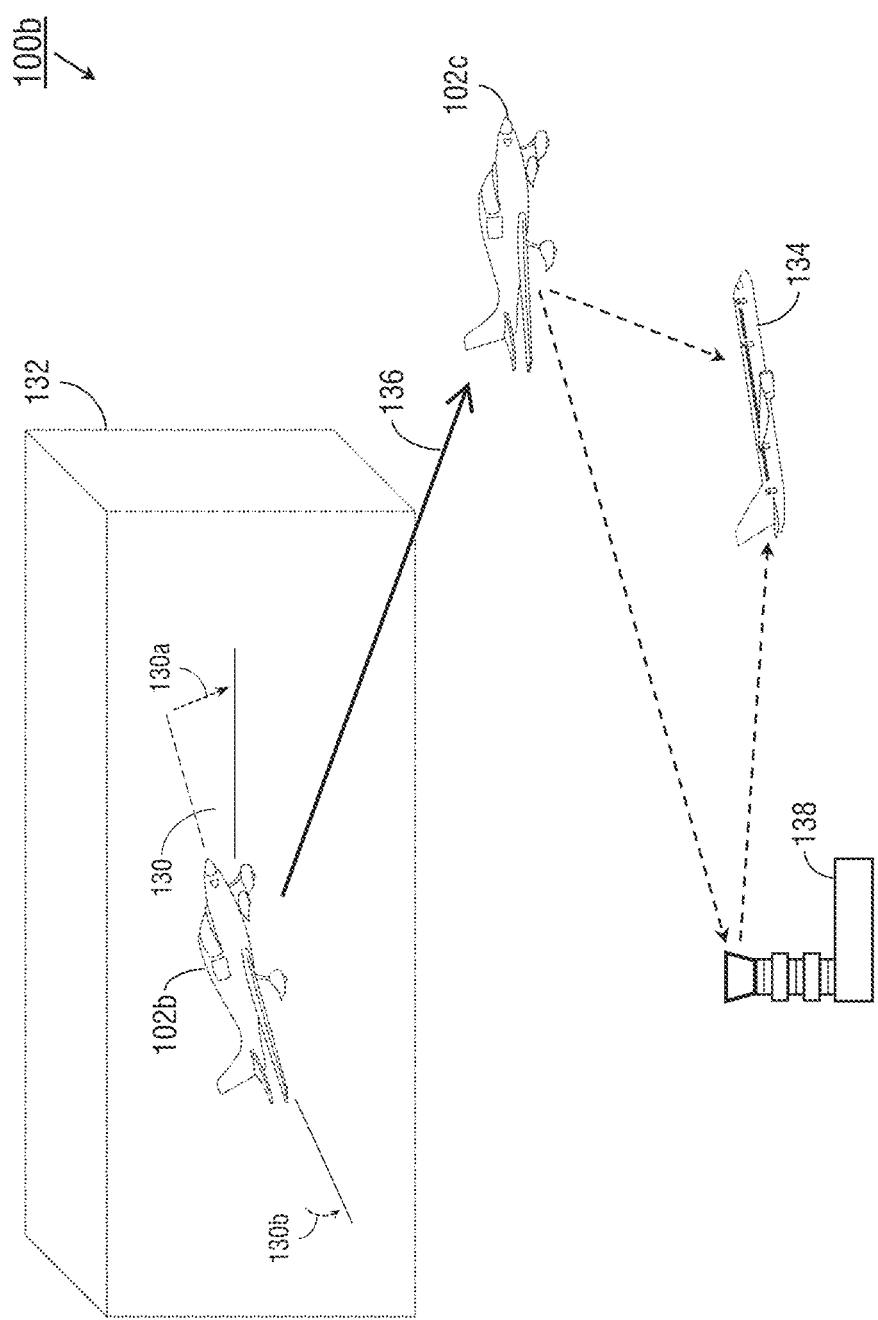
FIG. 3 illustrates operations of the system of FIG. 1.

Referring now to FIG. 3, the stall prediction and recovery system 100b may be implemented and may function similarly to the stall prediction and recovery system 100a of FIG. 1, except that the stall prediction and recovery system 100b may initiate automated recovery procedures in response to detected high-altitude upset or stall conditions. For example, the stall warning computer (114, FIG. 1) may detect stall conditions, or the stall prediction and recovery system 100b may itself declare stall conditions if, for example, imminent upset conditions have persisted or worsened, or if an imminent upset alert (or series of escalating imminent alerts) has resulted in either a lack of response or insufficient response (from, e.g., the pilot/crew or flight control system (104, FIG. 1)). In any such scenario, the stall prediction and recovery system 100b may respond to stall conditions by, for example, ensuring that the flight control system 104 follows proper procedures for high-altitude upset or stall recovery (even if said procedures are counterintuitive to the normal programming of the flight control system) and notifying the pilot and crew that an auto-recovery mode has been initiated.

For example, the aircraft 102b may be operating at a cruising altitude within an assigned envelope 132 (e.g., an allotted airspace or assigned altitude range/separation from other proximate air traffic 134). In the event of a stall, the stall prediction and recovery system 100b may first alert the pilot to the detected stall conditions (via the annunciators 108, FIG. 1) and that the stall prediction and recovery system 100b has engaged the stall auto-recovery mode so that the aircraft 102b may descend (136) to a safe level (102c) and thereby regain its target airspeed (e.g., a target airspeed associated with stable flight within a sufficiently broad delta (126a-b, FIG. 2)). Thus alerted that the automated stall recovery mode is active, the pilot may be reassured that effective recovery procedures to the stall have been initiated, and deterred from reacting counterintuitively in ways that may exacerbate the stall (e.g., disconnecting the autoflight system/FMS 112). The stall recovery alert may include unique aural annunciations or indications as well as unique visual symbology displayed via PFD or HUD (108b-c, FIG. 1).

Stall recovery procedures may include pitching the aircraft 102b downward (130a) to reduce its angle of attack (130, FIG. 2), e.g., via articulation of control surfaces (120, FIG. 1). If the aircraft 102b is in turning flight when the stall condition is declared (e.g., executing a prescribed turn over a waypoint), the stall prediction and recovery system 100b may roll the aircraft (130b) to wings-level. The stall prediction and recovery system 100b may, via the throttle 118, set the thrust of the aircraft 102b to the maximum operational level and accelerate to the target airspeed, controlling the rate of acceleration and descent (136) to prevent any overcorrection and possible overspeed (acceleration beyond the maximum maneuvering speed (e.g., $V_A$, $V_O$)). The stall prediction and recovery system 100b may continue to notify the pilot (via the annunciators 108) by providing indications of ongoing recovery procedures and conditions, e.g., minimum and maximum operating airspeed (124a-b); pitch, roll, and thrust guidance cues for recovery procedures; and any airspeed and/or altitude settings of the flight control system 104 overridden by the stall prediction and recovery system 100b.

As the aircraft 102b is accelerating and descending (136) according to automated recovery procedures initiated by the stall prediction and recovery system 100b, the aircraft 102b may temporarily descend out of its assigned envelope 132 (or from its assigned flight level) or into a position of potential conflict with a proximate aircraft 134. The stall prediction and recovery system 100b may identify (e.g., via Cockpit Display of Traffic Information (CDTI)) potential conflicting air traffic (e.g., proximate aircraft 134) and notify (via the transmitter 110) any proximate air traffic (as well as local air traffic control facilities 138) that the aircraft 102b is descending from its assigned altitude or flight level. For example, the transmitter 110 may include an ADS-B-compatible or TCAS-compatible transponder or transceiver for broadcasting traffic intent messages (via TCAS or ADS-B Out) to proximate aircraft 134 or air traffic control facility 138. If the proximate aircraft 134 is not equipped with TCAS or ADS-B In reception capability, the proximate aircraft may be notified of the change in altitude indirectly, via the air traffic control facility 138. The transmitter 110 may include datalink systems (e.g., high frequency (HF) ionospheric radio or controller-pilot data link communications (CP-DLC)) for issuing emergency or MAYDAY messages indicating the drop in altitude to the air traffic control facilities 138. Once the stall prediction and recovery system 100b has reestablished the target airspeed, the automated stall recovery mode may be disengaged and the pilot notified of the disengagement (via the annunciators 108) so that the aircraft 102c, now stabilized, can be returned to its assigned altitude or envelope (132).

Figure 4A:
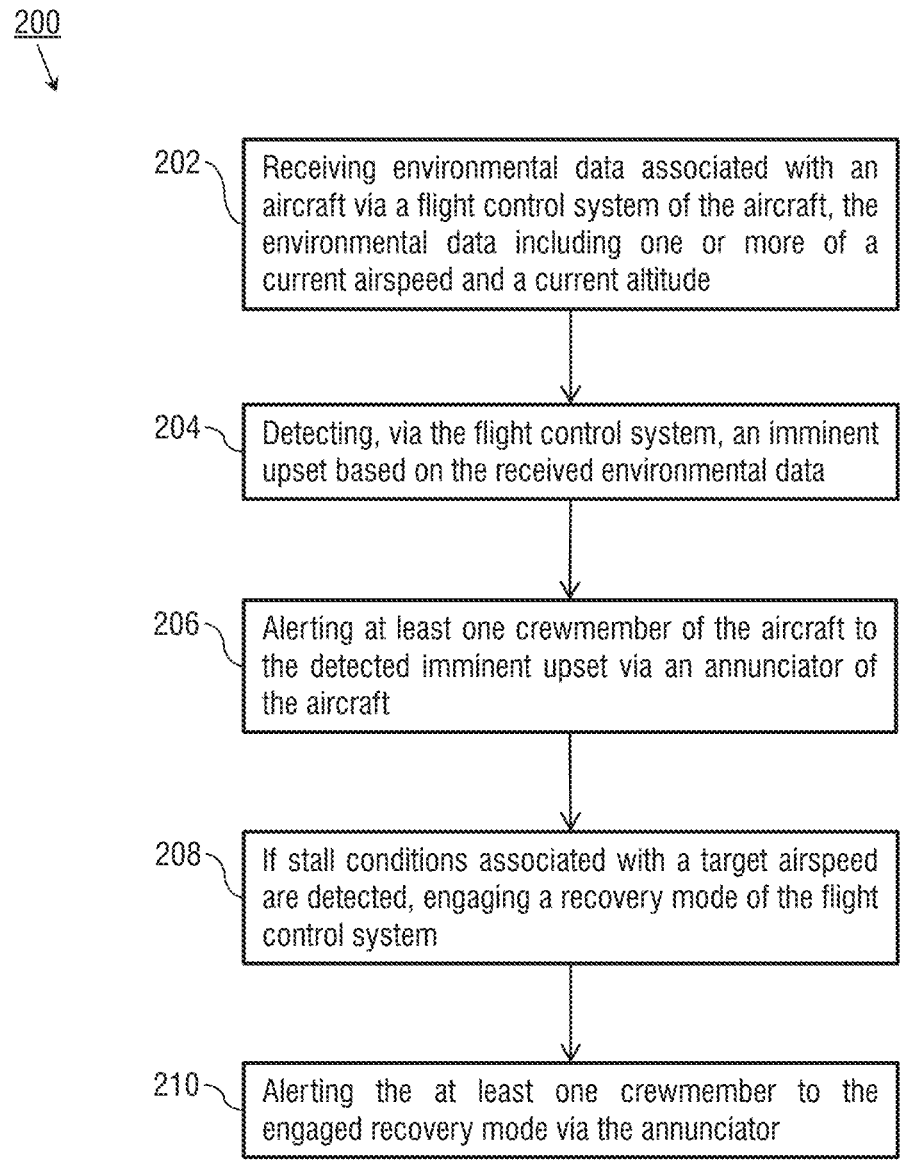
FIGS. 4A and 4B illustrate an exemplary embodiment of a method according to the inventive concepts disclosed herein.
Figure 4B:
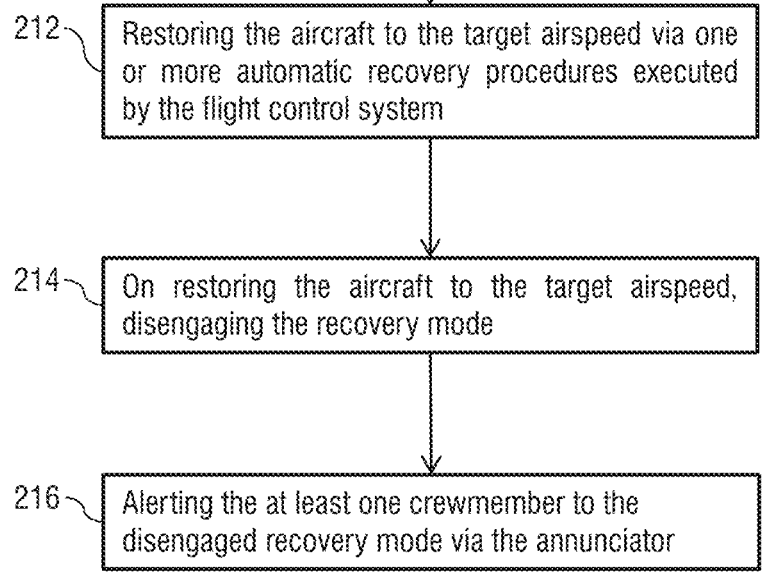

Referring now to FIGS. 4A and 4B, an exemplary embodiment of an aircraft-based method 200 for high-altitude stall prediction and automated stall recovery according to the inventive concepts disclosed herein may be implemented by the systems 100, 100a-b in some embodiments, and may include one or more of the following steps. Referring particularly to FIG. 4A, at a step 202 the flight control system receives environmental data associated with the aircraft, the environmental data including one or more of a current airspeed and a current altitude.

At a step 204, the stall prediction and recovery system detects imminent upset conditions based on the received environmental data. For example, the stall prediction and recovery system may monitor the minimum operating airspeed and maximum operating airspeed based on the airframe, the current altitude, and any observed environmental conditions, and compare the current airspeed to the maximum and minimum operating airspeeds.

At a step 206, the annunciators notify the pilot or crew of the imminent upset conditions.

At a step 208, if a stall warning is received or stall conditions are detected, the flight control system engages the stall auto-recovery mode.

At a step 210, the annunciators inform the pilot or crew of the engagement of the auto-recovery mode.

Referring now to FIG. 4B, at a step 212, the flight control system restores the aircraft to a target airspeed (associated with recovery from the stall condition) via one or more automated recovery procedures. For example, the flight control system may adjust an acceleration rate or altitude of the aircraft to regain the target airspeed. The flight control system may adjust throttles and control surfaces of the aircraft, or adjust the pitch and roll angles to stabilize the aircraft and descend to a safer altitude. The annunciators may inform the pilot or crew of the progress of each automated recovery procedure or of changes in the altitude, airspeed, or attitude. If the altitude of the aircraft deviates from its assigned altitude, the transmitters may notify any potentially conflicting proximate aircraft, as well as air traffic control facilities, of the deviation.

At a step 214, on restoring the aircraft to the target airspeed, the flight control system disengages the stall auto-recovery mode.

At a step 216, the annunciators inform the pilot or crew of the disengagement of the auto-recovery mode.

As will be appreciated from the above, systems and methods according to embodiments of the inventive concepts disclosed herein may keep the pilot informed as to the likelihood of a high-altitude upset or stall, as well as quickly reacting to upsets and stalls when they do occur by stabilizing the aircraft without additional intervention on the part of the pilot. In addition, the flight control system may be prevented from extending or exacerbating a high-altitude stall via response modes more effective for lower-altitude stall recovery. The situational awareness of the pilot and crew can be preserved by detailed notifications as to the automated recovery procedures taken by the aircraft and their effect on the stall.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. An aircraft-based system for recovery from high-altitude stalls, comprising:
   at least one flight control system coupled to at least one of an annunciator and a control function of the aircraft, the flight control system including at least one processor and configured to:
   receive environmental data associated with the aircraft, the environmental data including a current airspeed, an air temperature, an air pressure level, a wind direction, a wind magnitude, a barometric altitude, and a current altitude;
   detect an imminent high altitude stall based on the environmental data, the imminent high altitude stall associated with an underspeed condition;
   notify at least one crewmember associated with the aircraft of the detected imminent high altitude stall via the annunciator;
   determine at least one stall condition associated with a target airspeed;
   in response to the determined stall condition, engage a recovery mode;
   notify the at least one crewmember of the recovery mode via the annunciator;
   restore the aircraft to the target airspeed via one or more recovery procedures associated with at least one of the throttle and the control surface;
   and
   upon restoring the target airspeed, disengage the recovery mode;
   and
   at least one annunciator coupled to the flight control system and configured to notify the at least one crewmember by generating one or more of:
   an imminent high altitude stall notification associated with the detected imminent high altitude stall;
   an engagement notification associated with the engaged recovery mode;
   and
   a disengagement notification associated with the disengaged recovery mode.

2. The aircraft-based system of claim 1, wherein the at least one flight control system is configured to detect the imminent high altitude stall by:
   determining one or more of a maximum operating airspeed and a stall speed based on the environmental data, the maximum operating airspeed and the stall speed associated with the current altitude;
   determining a delta between the stall speed and the maximum operating airspeed based on the received environmental data;
   comparing the current airspeed to the maximum operating airspeed and the stall speed; and
   notifying the at least one crewmember to descend if the delta is not sufficiently broad.

3. The aircraft-based system of claim 1, wherein the control function includes at least one of a throttle of the aircraft and a control surface of the aircraft.

4. The aircraft-based system of claim 1, wherein the environmental data further includes a data point received from at least one sensor associated with the aircraft.

5. The aircraft-based system of claim 1, wherein the flight control system is at least partially embodied in a flight management system (FMS).

6. The aircraft-based system of claim 1, wherein the one or more recovery procedures include adjusting the at least one control function.

7. The aircraft-based system of claim 1, further comprising:
   at least one transmitter coupled to the flight control system and configured to transmit at least one potential conflicting air traffic message to a proximate air traffic recipient external to the aircraft.

8. The aircraft-based system of claim 7, wherein the one or more recovery procedures include:
   determining whether the current altitude deviates from a predetermined altitude;
   and
   notifying one or more of a proximate aircraft and an air traffic control facility of the deviation by sending the at least one message via the transmitter.

9. The aircraft-based system of claim 7, wherein:
   the at least one transmitter includes at least one of an ADS-B compatible transponder and an ADS-B compatible transceiver;
   and
   the at least one message includes at least one of an ADS-B Out message and a TCAS message.

10. The aircraft-based system of claim 1, wherein the at least one annunciator includes one or more of an aural alert system, a primary flight display (PFD), and a heads-up display (HUD).

11. The aircraft-based system of claim 1, wherein the flight control system is configured to determine the at least one stall condition by receiving at least one stall warning from a stall warning computer associated with the aircraft.

12. The aircraft-based system of claim 1, wherein the flight control system is configured to detect responsive input from the at least one crewmember in response to the imminent high altitude stall notification.

13. The aircraft-based system of claim 12, wherein the flight control system is configured to determine the at least one stall condition if the responsive input is not detected within a first response time.

14. The aircraft-based system of claim 12, wherein:
the one or more imminent high altitude stall notifications include a sequence of escalating alerts; and
the flight control system is configured to generate each of the escalating alerts if the responsive input is not detected within a second response time after the preceding escalating alert.

15. The aircraft-based system of claim 1, wherein the at least one annunciator is configured to notify the at least one crewmember by generating one or more procedure notifications corresponding to the one or more recovery procedures.

16. A method for high-altitude stall recovery, the method comprising:
receiving environmental data associated with an aircraft via a flight control system of the aircraft, the environmental data including a current airspeed, an air temperature, an air pressure level, a wind direction, a wind magnitude, a barometric altitude, and a current altitude;
detecting, via the flight control system, an imminent high altitude stall based on the received environmental data;
alerting at least one crewmember of the aircraft to the detected imminent high altitude stall via an annunciator of the aircraft;
if a stall condition associated with a target airspeed is detected, engaging a recovery mode of the flight control system;
alerting the at least one crewmember to the engaged recovery mode via the annunciator;
restoring the aircraft to the target airspeed via one or more automatic recovery procedures executed by the flight control system;
on restoring the aircraft to the target airspeed, disengaging the recovery mode; and
alerting the at least one crewmember to the disengaged recovery mode via the annunciator.

17. The method of claim 16, wherein detecting, via the flight control system, an imminent high altitude stall based on the received environmental data includes:
monitoring, via the flight control system, one or more of a stall speed and a maximum operational airspeed based on the received environmental data;
determining a delta between the stall speed and the maximum operating airspeed based on the received environmental data;
comparing the current airspeed to the stall speed airspeed and the maximum operating airspeed; and
notifying the at least one crewmember to descend if the delta is not sufficiently broad.

18. The method of claim 16, wherein restoring the aircraft to the target airspeed via one or more automatic recovery procedures executed by the flight control system includes:
rolling the aircraft to wings level if in a turn;
pitching the aircraft downward to reduce an angle of attack; and
restoring the aircraft to the target airspeed by adjusting one or more of a throttle of the aircraft and a control surface of the aircraft via the flight control system.

19. The method of claim 16, wherein restoring the aircraft to the target airspeed via one or more automatic recovery procedures executed by the flight control system includes:
alerting the at least one crewmember to the one or more automatic recovery procedures via the annunciator.

20. The method of claim 16, wherein restoring the aircraft to the target airspeed via one or more automatic recovery procedures executed by the flight control system includes:
if the current altitude is outside a predetermined altitude threshold, notifying one or more of an air traffic control facility and a proximate aircraft via a transmitter of the aircraft.

* * * * *